(12) United States Patent
Bratkovski et al.

(10) Patent No.: US 7,805,030 B2
(45) Date of Patent: Sep. 28, 2010

(54) OPTICAL STRUCTURES INCLUDING SELECTIVELY POSITIONED COLOR CENTERS, PHOTONIC CHIPS INCLUDING SAME, AND METHODS OF FABRICATING OPTICAL STRUCTURES

(75) Inventors: Alexandre M. Bratkovski, Mountain View, CA (US); Theodore I. Kamins, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 814 days.

(21) Appl. No.: 11/716,174

(22) Filed: Mar. 8, 2007

(65) Prior Publication Data

US 2008/0219311 A1    Sep. 11, 2008

(51) Int. Cl.
*G02B 6/12* (2006.01)
(52) U.S. Cl. ....................................................... 385/14
(58) Field of Classification Search ........................ None
See application file for complete search history.

(56) References Cited

U.S. PATENT DOCUMENTS

2008/0063339 A1\* 3/2008 Spillane et al. ............... 385/14

OTHER PUBLICATIONS

Rabeau, J.R., et al., "Implantation of labelled single nitrogen vacancy centers in diamond using 15N", 2006, American Institute of Physics, vol. 88, pp. 1-3.

\* cited by examiner

*Primary Examiner*—Sarah Song

(57) ABSTRACT

Various aspects of the present invention are directed to optical structures including selectively positioned color centers, methods of fabricating such optical structures, and photonic chips that utilize such optical structures. In one aspect of the present invention, an optical structure includes an optical medium having a number of strain-localization regions. A number of color centers are distributed within the optical medium in a generally selected pattern, with at least a portion of the strain-localization regions including one or more of the color centers. In another aspect of the present invention, a method of positioning color centers in an optical medium is disclosed. In the method, a number of strain-localization regions are generated in the optical medium. The optical medium is annealed to promote diffusion of at least a portion of the color centers to the strain-localization regions.

20 Claims, 19 Drawing Sheets

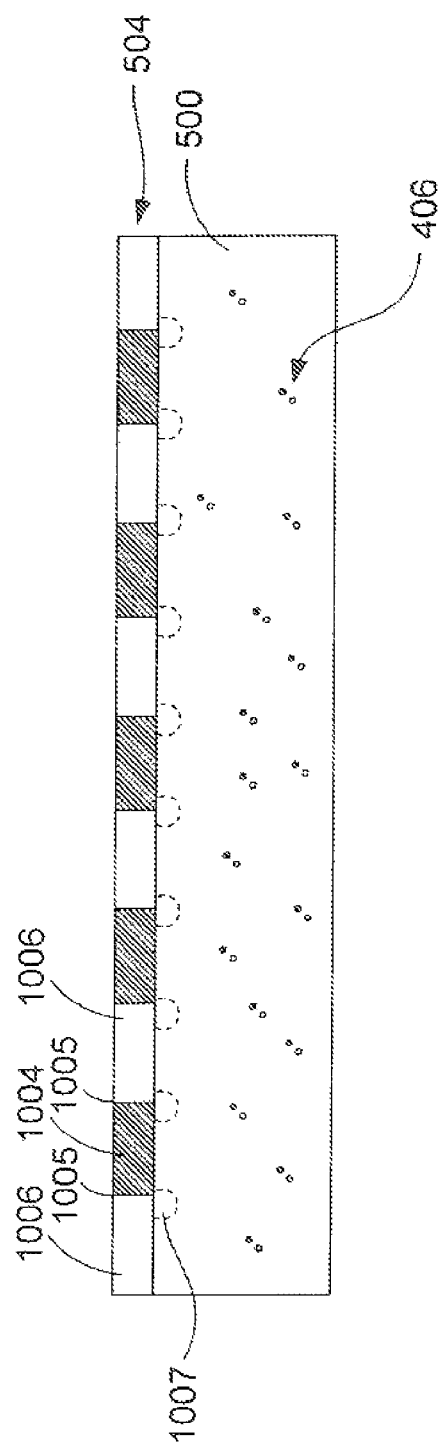
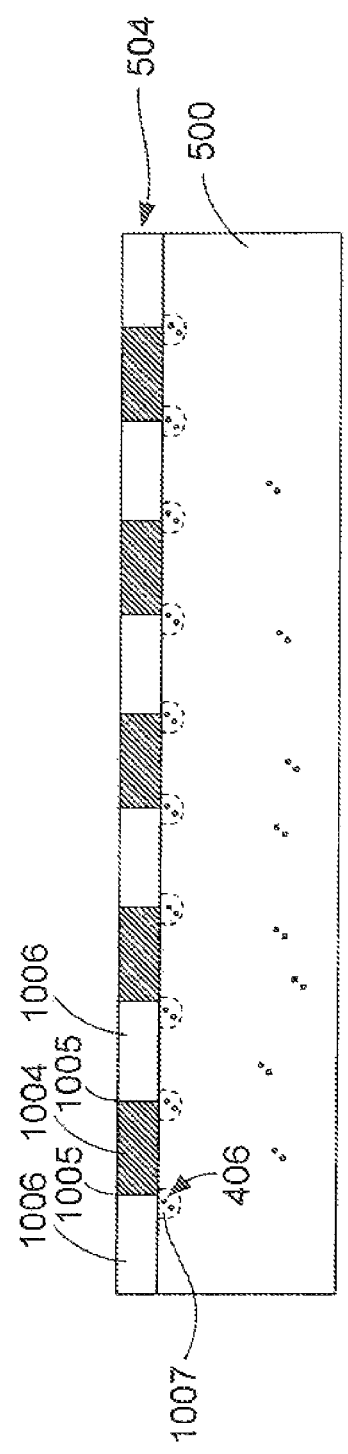
Figure 10B
Figure 10C

OPTICAL STRUCTURES INCLUDING SELECTIVELY POSITIONED COLOR CENTERS, PHOTONIC CHIPS INCLUDING SAME, AND METHODS OF FABRICATING OPTICAL STRUCTURES

TECHNICAL FIELD

Embodiments of the present invention generally relate to optical structures including selectively positioned color centers, methods of fabricating such optical structures, and photonic chips that utilize such optical structures.

BACKGROUND

Advancements in disciplines ranging from atomic physics to various branches of condensed matter physics are being employed to fabricate a variety of different diamond-based materials that can be used in many different technological applications. Diamond has a crystal-lattice structure comprising two interpenetrating face-centered cubic lattices of carbon atoms. FIG. 1 shows a unit cell 100 of a diamond-crystal lattice. In FIG. 1, each carbon atom, represented by a sphere, is covalently bonded to four adjacent carbon atoms, each covalent bond is represented by a rod connecting two spheres. As shown in FIG. 1, a carbon atom 102 is covalently bonded to four carbon atoms 103-106. In general, diamond has a number of potentially useful properties. For example, diamond is transparent from the ultraviolet to the far infrared of the electromagnetic spectrum and has a relatively high refractive index of about 2.42. Diamond may also be a suitable replacement for silicon in semiconductor devices. For example, silicon has an electronic bandgap of about 1.12 eV and starts to show signs of thermal stress at about 100° Celsius, while diamond has a larger electronic bandgap ranging from about 5 eV to about 7 eV and a higher Debye temperature ranging from about 1550° Celsius to about 1930° Celsius.

Diamond may have certain crystal defects, called "color centers," that have potential applications in quantum computing and quantum information processing. For example, a nitrogen-vacancy ("NV") center embedded in diamond is a type of color center that may be used to store a quantum bit of information. FIG. 2 shows an NV center embedded in a diamond-crystal lattice 200. The NV center comprises a nitrogen atom 202, substituted for a carbon atom, next to a vacancy 204 in the carbon lattice. The nitrogen atom 202 is covalently bonded to three carbon atoms 206-208. NV centers can be created in nitrogen-containing diamond by irradiation and subsequent annealing at temperatures above 550° C. The radiation creates vacancies in the diamond and subsequent annealing causes the vacancies to migrate towards nitrogen atoms to produce NV centers. Alternatively, NV centers can be created in diamond using $N^+$ ion implantation.

When an electromagnetic field interacts with an NV center, there is a periodic exchange, or oscillation, of energy between the electromagnetic field and the electronic energy levels of the NV center. Such oscillations, which are called "Rabi oscillations," are associated with oscillations of the NV center electronic energy level populations and quantum-mechanical probability amplitudes of the NV center electronic energy states. Rabi oscillations can be interpreted as an oscillation between absorption and stimulated emission of photons. The Rabi frequency, denoted by $\Omega$, represents the number of times these oscillations occur per unit time.

FIG. 3 illustrates an energy-level diagram of electronic states of a negatively charged NV center. Under applied stress or an electric field, the $E_3$ excited states, which have an optical doublet, spin triplet structure, split into upper and lower branches with different orbital states. Only the lower branch of the excited states, consisting of three spin levels, is shown in the FIG. 3. Normally, the optical transitions are spin converging. However, when the orbital splitting induced by the applied stress or electric field is in a range from about 15 GHz to about 45 GHz, the spin-orbit interaction can mix the excited states so that spin-non-conserving transitions are allowed. In this case, it may be possible to obtain $\Lambda$-type configuration comprising multiple ground states coupled to a common excited state. The three ground $^3A_2$ states comprise a first ground state $|1\rangle$ with a lowest energy level 300, and a pair of nearly degenerate ground states $|2\rangle$ and $|3\rangle$ with energy levels 302 and 304, respectively. In FIG. 3, all three ground states are coupled to an excited state 306, labeled $|4\rangle$. The three double-headed directional arrows 308-310, correspond to optical transitions that may be driven by two laser frequencies. A first laser drives the $|1\rangle \rightarrow |4\rangle$ transition, while a second laser drives both the $|2\rangle \rightarrow |4\rangle$ and the $|3\rangle \rightarrow |4\rangle$ transitions. A parameter $\delta_1$ represents the laser frequency detuning for a $|1\rangle \rightarrow |4\rangle$ transition, a parameter $\delta_2$ is the laser frequency detuning for a $|2\rangle \rightarrow |4\rangle$ transition, and a parameter $\delta_{23}$ is the $|2\rangle \leftrightarrow |3\rangle$ energy splitting. When $\delta_1 = \delta_2$ or $\delta_1 = \delta_2 + \delta_3$, the system will relax through spontaneous emission into stable "dark" states, which are linear combinations of the states $|1\rangle$, $|2\rangle$, and $|3\rangle$, with probability amplitudes that are tunable through the laser amplitudes. These dark resonance states can be used, for example, for all-optical manipulation of the electron spin. Note that the exact structure of the $^3E$ state depends on the strain or other mechanical effects exerted on the diamond crystal. Also, the excited-state linewidths depend on the temperature. In order to obtain optical linewidths that are less than 100 MHz, the temperature of the diamond crystal is usually lowered to a temperature below 20K. With narrow optical linewidths, it is possible to manipulate the spins of single NV centers using the optical transitions shown in FIG. 3.

The NV centers are appealing for quantum information processing because the NV center has a relatively long-lived spin coherence time and a possibility of large-scale integration into diamond structures using semiconductor processing technology. For example, an NV center has been observed to have an electron spin coherence time of 58 μm at room temperature and much longer electron spin coherence times have been observed at temperatures below room temperature. NV centers may have relatively long-lived spin coherence because the lattice comprises primarily $^{12}C$, which has zero nuclear spin. In addition, a single photon can be generated from an NV center at room temperature, which has established NV centers as potential photon sources for quantum cryptography.

However, it is difficult to control the precise location of the NV centers in diamond using conventional fabrication techniques, such as ion implantation or irradiation of nitrogen-containing diamond. In order to take advantage of the unusual electronic and optical properties of NV centers for photonic devices, it is important to be able to accurately position the NV centers. Therefore, manufacturers and designers of photonic devices can appreciate a need for being able to accurately position color centers in diamond or other optical media in order to fabricate useful photonic devices.

SUMMARY

Various aspects of the present invention are directed to optical structures including selectively positioned color centers, methods of fabricating such optical structures, and photonic devices that utilize such optical structures. In one aspect of the present invention, an optical structure includes an optical medium having a number of strain-localization regions. A number of color centers are distributed within the optical medium in a generally selected pattern, with at least a portion of the strain-localization regions including one or more of the color centers.

In another aspect of the present invention, a photonic chip includes an optical structure having color centers that are distributed in a generally selected pattern. The photonic chip may be operated as a processor, memory array, or any other device in applications, such as metrology, quantum information processing, quantum computing, and storing quantum information.

In yet another aspect of the present invention, a method of positioning color centers in an optical medium is disclosed. In the method, a number of strain-localization regions are generated in the optical medium. The optical medium is annealed to promote diffusion of at least a portion of the color centers to the strain-localization regions.

BRIEF DESCRIPTION OF THE DRAWINGS

The drawings illustrate various embodiments of the present invention, wherein like reference numerals refer to like elements or features in different views or embodiments shown in the drawings.

FIG. 10B is schematic cross-sectional view, and FIG. 10C is a schematic cross-sectional view that illustrate various stages in a method of forming strain-localization regions in an optical medium using ion implantation so that color centers may be selectively positioned within the optical medium according to another embodiment of the present invention.

DETAILED DESCRIPTION OF VARIOUS EMBODIMENTS

Figure 4:
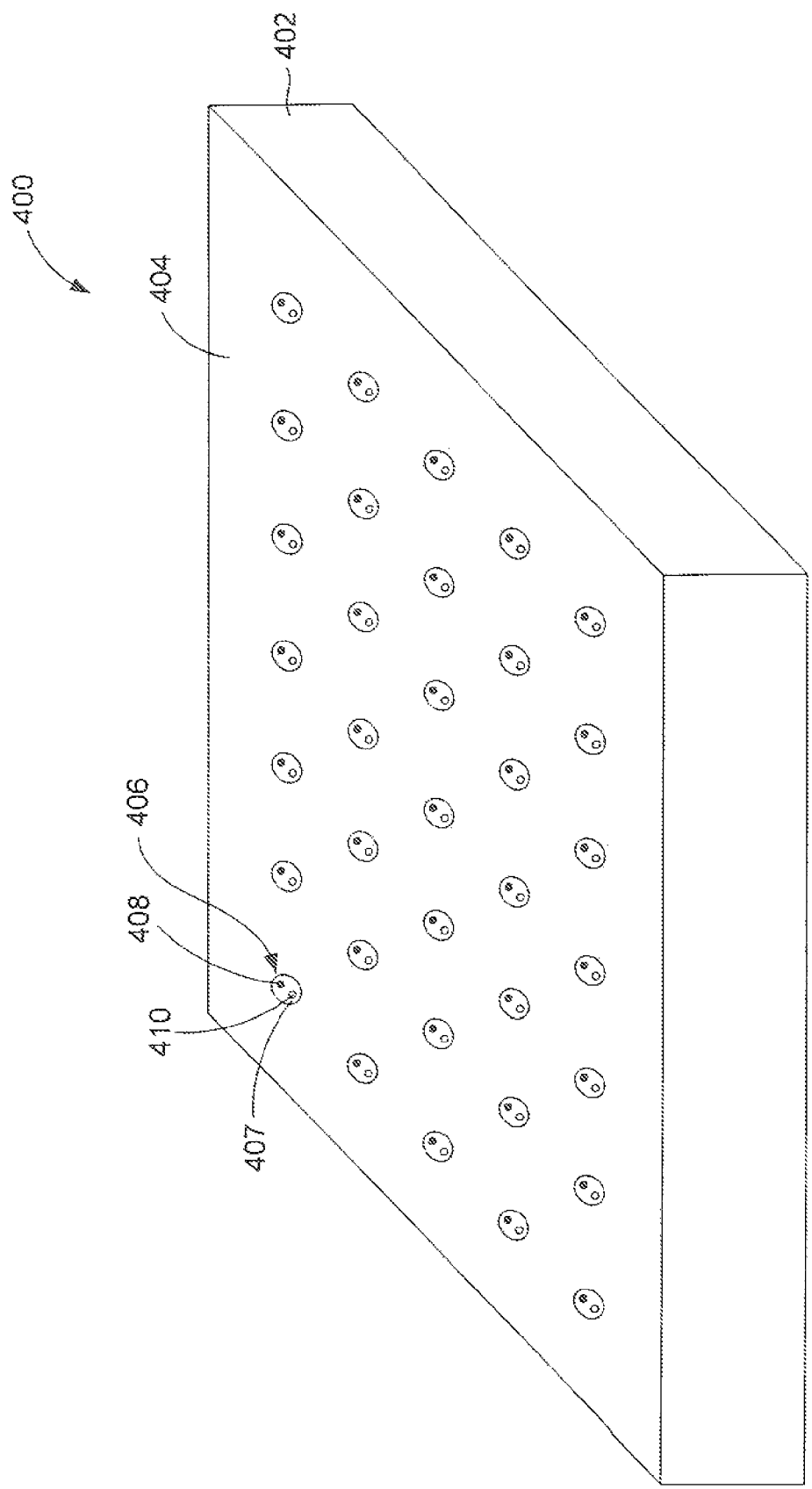
FIG. 4 is a schematic isometric view of an optical structure including a number of color centers that are selectively positioned according to one embodiment of the present invention.

Various embodiments of the present invention are directed to optical structures including selectively positioned color centers and methods of fabricating such optical structures. The disclosed optical structures may be used in quantum information devices and other photonic devices. FIG. 4 shows an optical structure 400 according to one embodiment of the present invention. The optical structure 400 includes an optical medium 402 having a surface 404. A number of color centers 406 are distributed within the optical medium 402 in a selected pattern, and the color centers 406 are located at or proximate the surface 404. Each of the color centers 406 is located within a strain-localization region 407 of the optical medium 402 (shown having an arbitrary shape), and may reside at or proximate a location of maximum strain within a corresponding strain-localization region 407, which is a low-energy position for the color centers 406. The strain-localization regions 407 are regions in the optical medium 402 in which the strain field is substantially greater than the strain field far from the strain-localization regions 407. The optical medium 402 may be made from a number of different materials that are optically transparent to a selected frequency or range of selected frequencies of electromagnetic radiation that the color centers 406 can absorb. Examples of suitable materials for the optical medium 402 include, but are not limited to, diamond, aluminum oxide, and refractory metal oxides. All of the color centers 406 may be the same type of color center or a number of different types of color centers may be embedded in the optical medium 402. For example, when the optical medium 402 comprises diamond, each of the color centers 406 may be an NV center with a solid circle 408 representing a nitrogen atom and an open circle 410 representing a vacancy as illustrated in FIG. 4. However, diamond may have a number of other color centers, such as a nickel center, a nickel-nitrogen complex center, or a silicon-vacancy center formed in a diamond layer using well-known techniques.

Figure 5A:
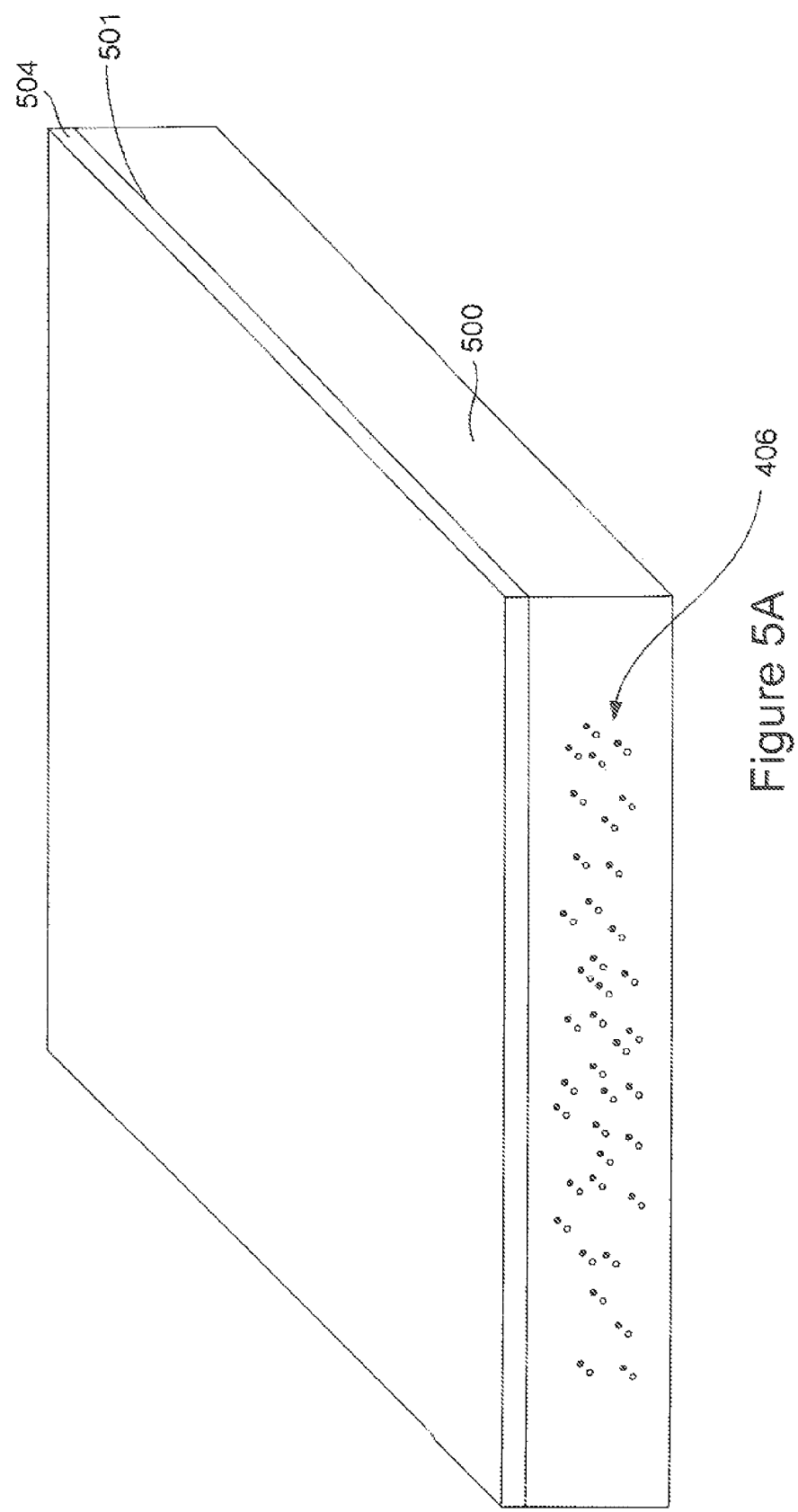
FIGS. 5A-5C are schematic isometric views that illustrate various stages in a method of forming an optical structure including strained structures that induce strain-localization regions in an optical medium for selectively positioning color centers according to one embodiment of the present invention.
Figure 5B:
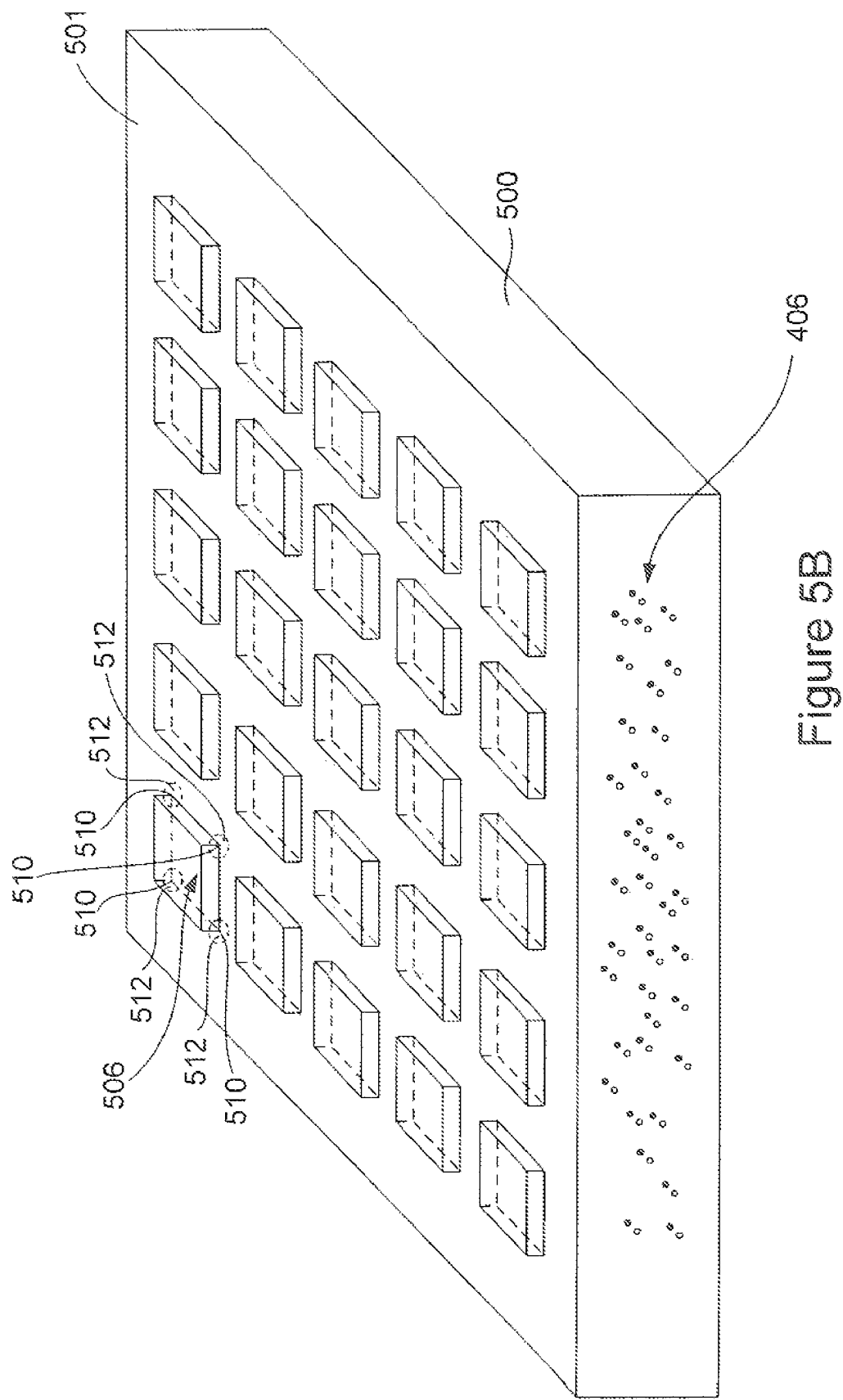
Figure 5C:
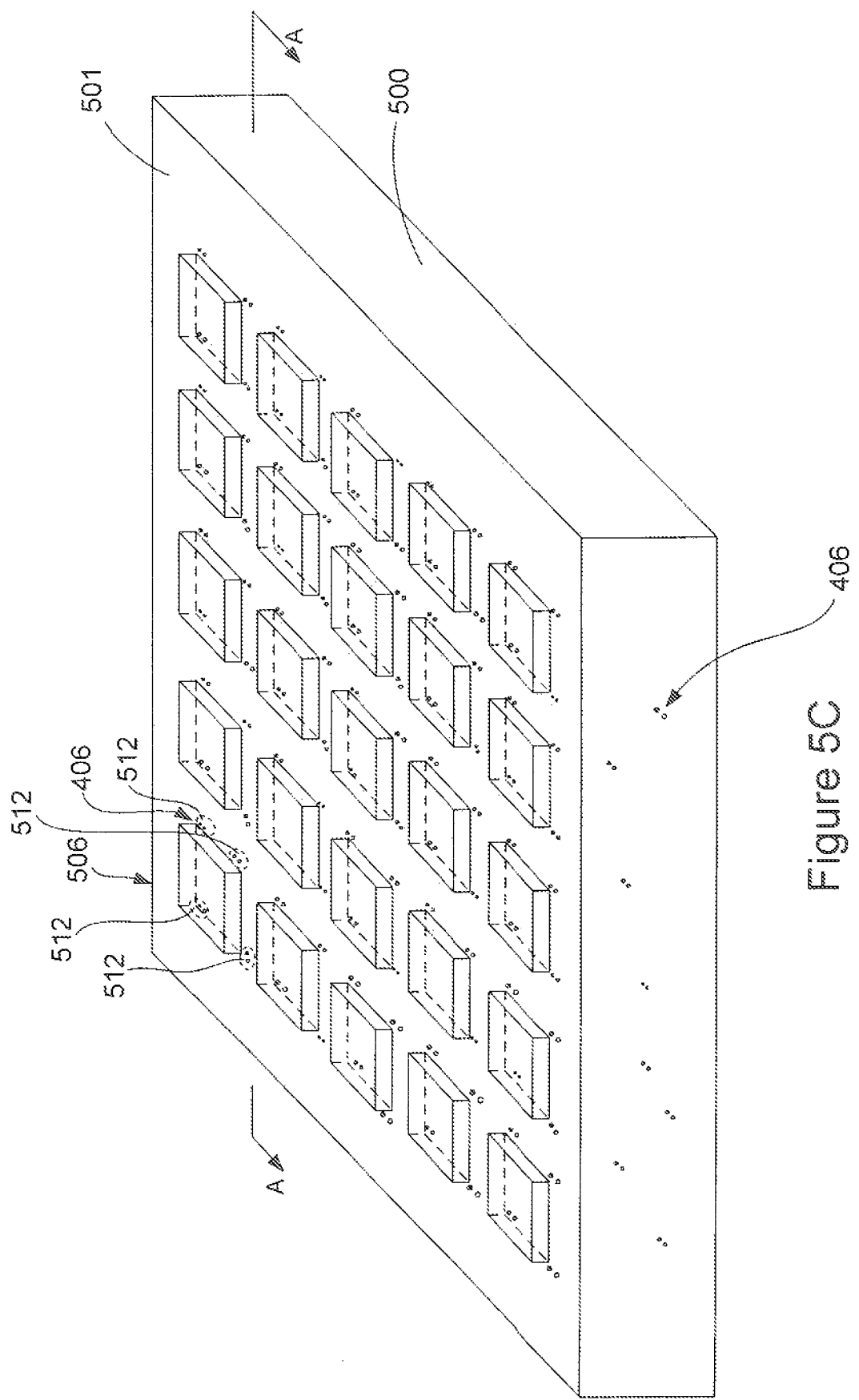

Several different embodiments of the present invention are discussed below for generating strain-localization regions within an optical medium that enable selectively positioning color centers. FIGS. 5A-5C illustrate various stages in a method of forming an optical structure including strained structures that induce strain-localization regions in an optical medium according to a more specific embodiment of the present invention. Inducing the strain-localization regions in the optical medium enables selectively positioning color centers within the optical medium.

As shown in FIG. 5A, an optical medium 500 having an interfacial surface 501 is provided. The optical medium 500 may be made from any of the previously described optical materials and a number of color centers 406 are embedded within and randomly distributed within the optical medium 500. For example, NV centers may be formed by irradiating a nitrogen-containing diamond layer formed by chemical vapor deposition ("CVD") on a substrate, followed by annealing to form the NV centers. The NV centers may also be formed by implanting nitrogen ions into an optical medium comprising diamond. A strained layer 504 is deposited on the interfacial surface 501 of the optical medium 500. The strained layer 504 may be formed from a number of different materials and deposited using physical or chemical deposition techniques, such as CVD, sputtering, or another suitable deposition process. For example, in various embodiments of the present invention, the strained layer 504 may be a non-epitaxial layer comprising titanium, a refractory metal (e.g., tungsten, molybdenum, niobium, tantalum, and rhenium), or alloys of any of the preceding metals. Other materials for the strained layer 504 that are not epitaxially grown on the interfacial surface 501 include, but are not limited to, metal oxides, metal nitrides, and metal carbides, such as refractory metal oxides, nitrides, and carbides. In other embodiments of the present invention, the strained layer 504 may be an epitaxial layer, such as gallium arsenide, silicon, germanium, or another suitable material having a diamond or zinc-blende crystal structure.

The strained layer 504 induces large elastic strains and stresses within the underlying optical medium 500. When the strained layer 504 is a non-epitaxial layer deposited at high-temperature, the thin film comprising the strained layer 504 bonds to the interfacial surface 501. As the temperature is lowered, the thin film attempts to laterally contract, often at a different rate than that of the substrate on which the optical medium 500 may be formed. However, the strained layer 504 is constrained due to being bonded to the interfacial surface 501. Consequently, large elastic in-plane tensile or compressive strains and stresses are generated within the strained layer 504. The tensile or compressive strains and stresses within the strained layer 504 induce a strain and stress field in the underlying optical medium 500. When the strained layer 504 is epitaxially grown on the interfacial surface 501 of the optical medium 500, the elastic strains and stresses developed within the strained layer 504 may be due, predominately, to a lattice mismatch between the optical medium 500 and the strained layer 504.

Next, as shown in FIG. 5B, the strained layer 504 is patterned to form a number of rectangular-shaped strained structures 506 arranged in a selected pattern on the interfacial surface 501. In the illustrated embodiment, each of the strained structures 506 includes lower vertices 510 (i.e., stress-concentration features) adjacent to the interfacial surface 501. A stress-concentration feature is a geometric feature in a structure such as, an edge, a corner, or a vertex that is configured to concentrate strain and stress. In the illustrated embodiment shown in FIG. 5B, because each of the strained structures 506 is under stress and strain, the lower vertices 510 function as stress-concentration features that locally intensify or concentrate stress and strain at and near the lower vertices 510 compared to other regions of the strained structures 506. As will be discussed in more detail below, the lower vertices 510 also induce strain-localization regions 512, shown having an arbitrary shape, adjacent to the lower vertices 510 in the optical medium 500. The strain-localization regions 512 are regions in the optical medium 500 in which the strain field is substantially greater than the strain field far from the lower vertices 510 of the strained structures 506 caused by strain induced during processing by the strained structures 506, lattice mismatch between the strained structures 506 and the optical medium 500, or both. The strained structures 506 may be formed by photolithographically patterning a resist layer and etching through the strained layer 504 using, for example, reactive ion etching ("RIE"). Other fabrication techniques include masked or focused ion beam milling, or another suitable material removal technique.

Figure 5D:
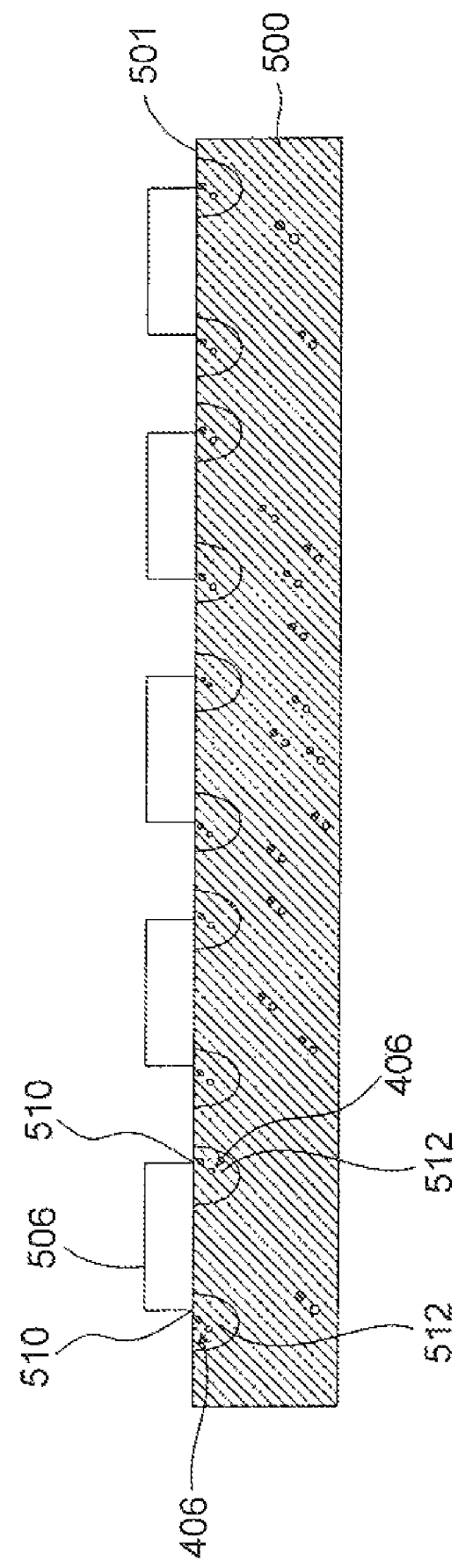
FIG. 5D is a schematic cross-sectional view of the optical structure taken along line A-A shown in FIG. 5C.

As shown in the schematic isometric view of FIG. 5C and the schematic cross-sectional view of FIG. 5D, the in-process structure shown in FIG. 5B is annealed to promote diffusion of the color centers 406 to the strain-localization regions 512 of the optical medium 500. Annealing may be performed at a temperature sufficient time to allow diffusion of at least a portion of the color centers 406 to the strain-localization regions 512 in the optical medium 500. For example, annealing at a temperature of at least about 700° Celsius is sufficient to cause diffusion of color centers in diamond in an acceptable amount of time. In the absence of patterning the strained layer 504 to form the strained structures 506, annealing would cause the color centers 406 to diffuse to low-energy positions at or proximate to the interfacial surface 501 where surface defects, such as terraces and steps are typically present. However, the lower vertices 510 of the strained structures 504 induce the strain-localization regions 512 in the optical medium 500. The strain field, within each of the strain-localization regions 512, decreases generally away from the interfacial surface 501 and the lower vertices 510 of the strained structures 506. A location of maximum strain within a respective strain-localization region 512 is typically adjacent to a corresponding lower vertex 510 in the underlying optical medium 500. As the color centers 406 randomly diffuse toward the interfacial surface 501 during annealing and enter the strain-localization regions 512, at least a portion of the color centers 406 are directed by the strain gradient of the strain-localization regions 512 to a location at or proximate to a maximum strain within the strain-localization regions 512.

In general, the color centers 406 diffuse to the closest one of the strain-localization regions 512. Additionally, within an individual strain-localization region 512, more than one of the color centers 406 may be at or proximate to the location of maximum strain. Thus, after annealing, the color centers 406 are distributed in a regular pattern based upon the location of the strain-localization regions 512 generated within the optical medium 500 by the strained structures 506. However, because the distribution of the color centers 406 is caused by a diffusion process, the location of some of the color centers 406 may deviate slightly from their desired location, but the color centers 406 may still be located within acceptable tolerances for use in a photonic device.

Figure 6A:
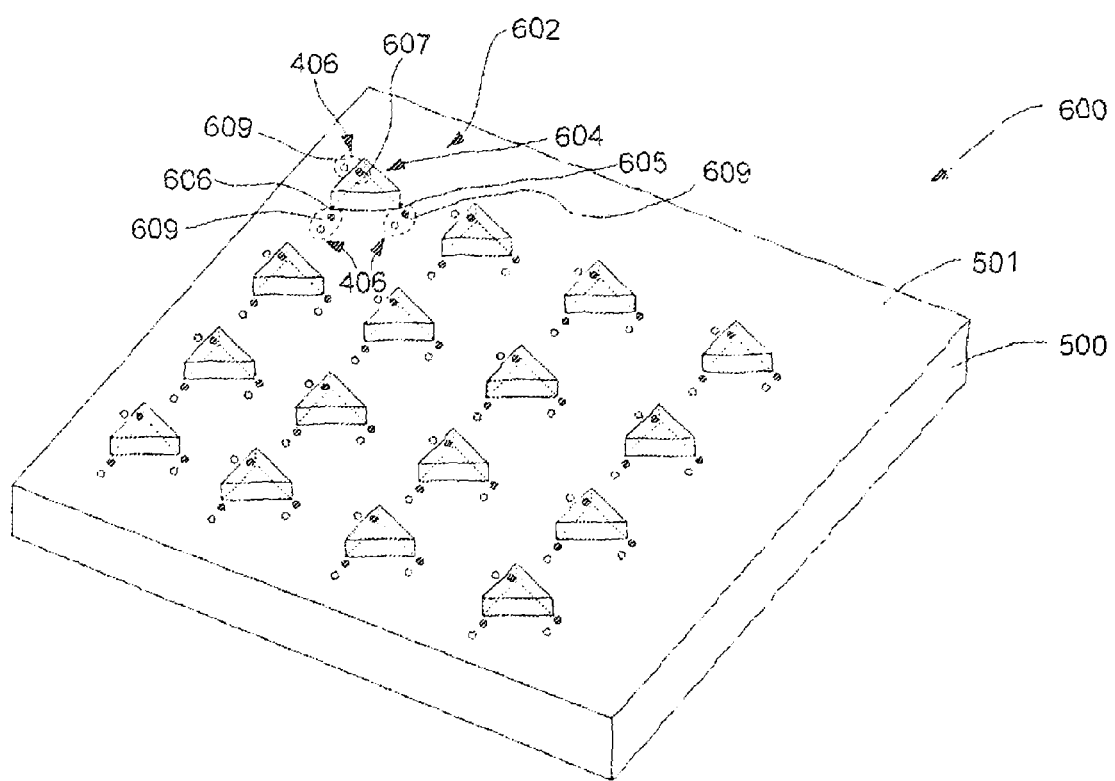
FIG. 6A is a schematic isometric view of an optical structure including an arrangement of triangular-shaped strained structures formed on an optical medium, with a color center positioned in the optical medium adjacent to vertices of the strained structures, according to another embodiment of the present invention.
Figure 6B:
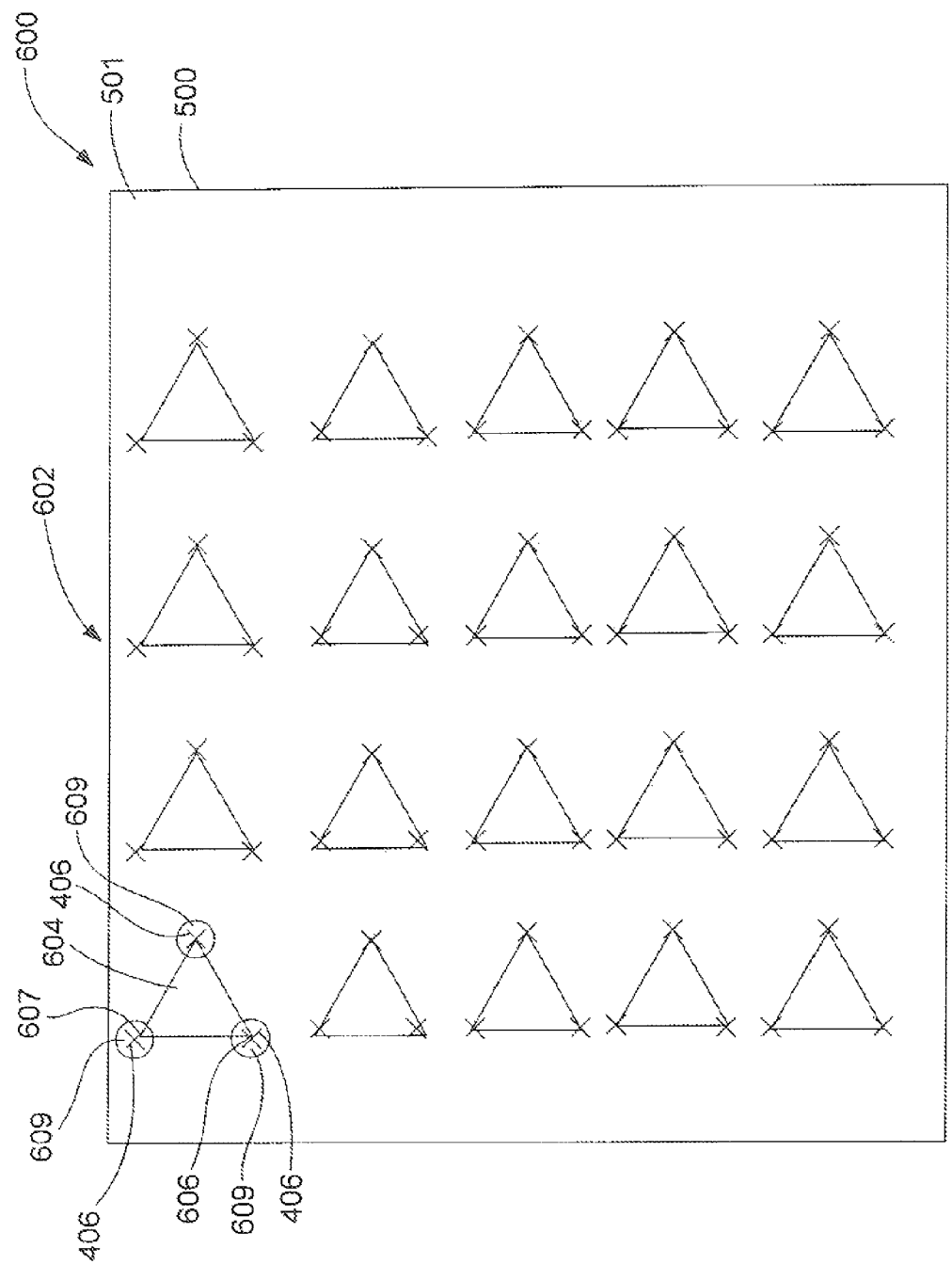
FIG. 6B is a schematic plan view of the optical structure shown in FIG. 6A.

FIGS. 6A and 6B show an optical structure 600, according to another embodiment of the present invention, in which the color centers 406 are selectively positioned within the optical medium 500. An array 602 of triangular-shaped strained structures 604 are formed on the interfacial surface 501 of the optical medium 500 in a selected pattern in the same or similar manner as the strained structures 506 shown in FIGS. 5A-5D. For example, the strained layer 504 shown in FIG. 5A may be patterned as previously described to form the strained structures 604. Each of the strained structures 604 has lower vertices 605-607. Each of the lower vertices 605-607 of the strained structures 604 is a strain-concentration feature that induces a strain-localization region 609 in the optical medium 500 adjacent to one of the lower vertices 605-607. As previously described, subjecting the optical medium 500 having the strained structures 604 formed thereon to an annealing process causes color centers 406 (represented as an X in FIG. 6B) embedded within the optical medium 500 to diffuse toward the interfacial surface 501. Each of the color centers 406 that diffuse into one of the strain-localization regions 609 is directed toward a location of maximum strain therein that is adjacent to one of the lower vertices 605-607. Thus, as illustrated in FIGS. 6A and 6B, after annealing, at least a portion of the color centers 406 are located in the optical medium 500 at or proximate to the interfacial surface 501 adjacent to each of the lower vertices 605-607 of the strained structures 604. Accordingly, the color centers 406 may be arranged in a selected pattern by using the triangular-shaped strained structures 604 to induce the strain-localization regions 609 in the optical medium 500.

Figure 7:
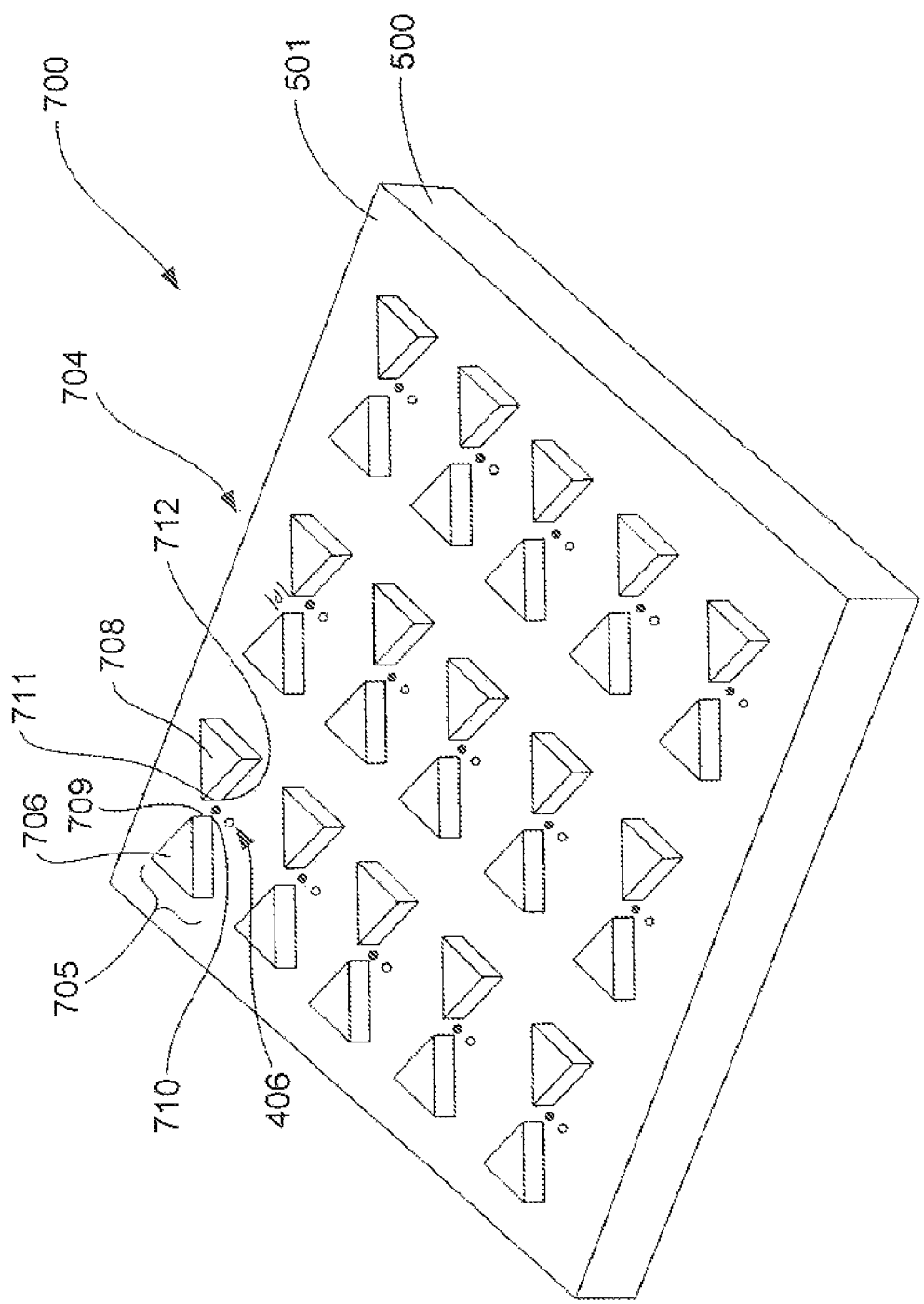
FIG. 7 is a schematic plan view of an optical structure including an arrangement of strained structures formed on an optical medium in which a maximum strain of the strain-localization regions is induced by and located between adjacent strained structures according to yet another embodiment of the present invention.

FIG. 7 shows an optical structure 700, according to yet another embodiment of the present invention, in which the color centers 406 are selectively positioned within the optical medium 500. As will be described in more detail below, in the optical structure 700, strained structures are positioned so that their respective strain fields interact to result in a maximum strain located between adjacent strained structures. An array 704 of strained structures is formed on the interfacial surface 501 of the optical medium 500 in the same or similar manner as the strained structures 506 in FIGS. 5A-5D. For example, the strained layer 504 shown in FIG. 5A may be patterned, as previously described, to form the array 704. The array 704 includes a number of sets 705 of strained structures 706 and 708, each of which has a triangular shape. The strained structures 706 and 708 are positioned adjacent to each other. The strained structure 706 includes a vertical edge 709 with a lower vertex 710 that is positioned opposite to a vertical edge 711 with a lower vertex 712 of the strained structure 708. As previously described, the strained structures 706 and 708 induce strain-localization regions (not shown) in the underlying optical medium 500. The spacing d of the lower vertices 710 and 712 of the strained structures 706 and 708 is sufficiently close so that the strain fields associated with the vertices 710 and 712 interact with each other. The interaction of the strain fields results in a maximum strain within the optical medium 500 that is located between the lower vertices 710 and 712 of each of the sets 705 of the strained structures 706 and 708. Accordingly, as shown in FIG. 7, upon annealing, the color centers 406 have a preference to diffuse to a location in the optical medium 500 at or proximate the interfacial surface 501 and a maximum strain located between the strained structures 706 and 708.

Figure 8:
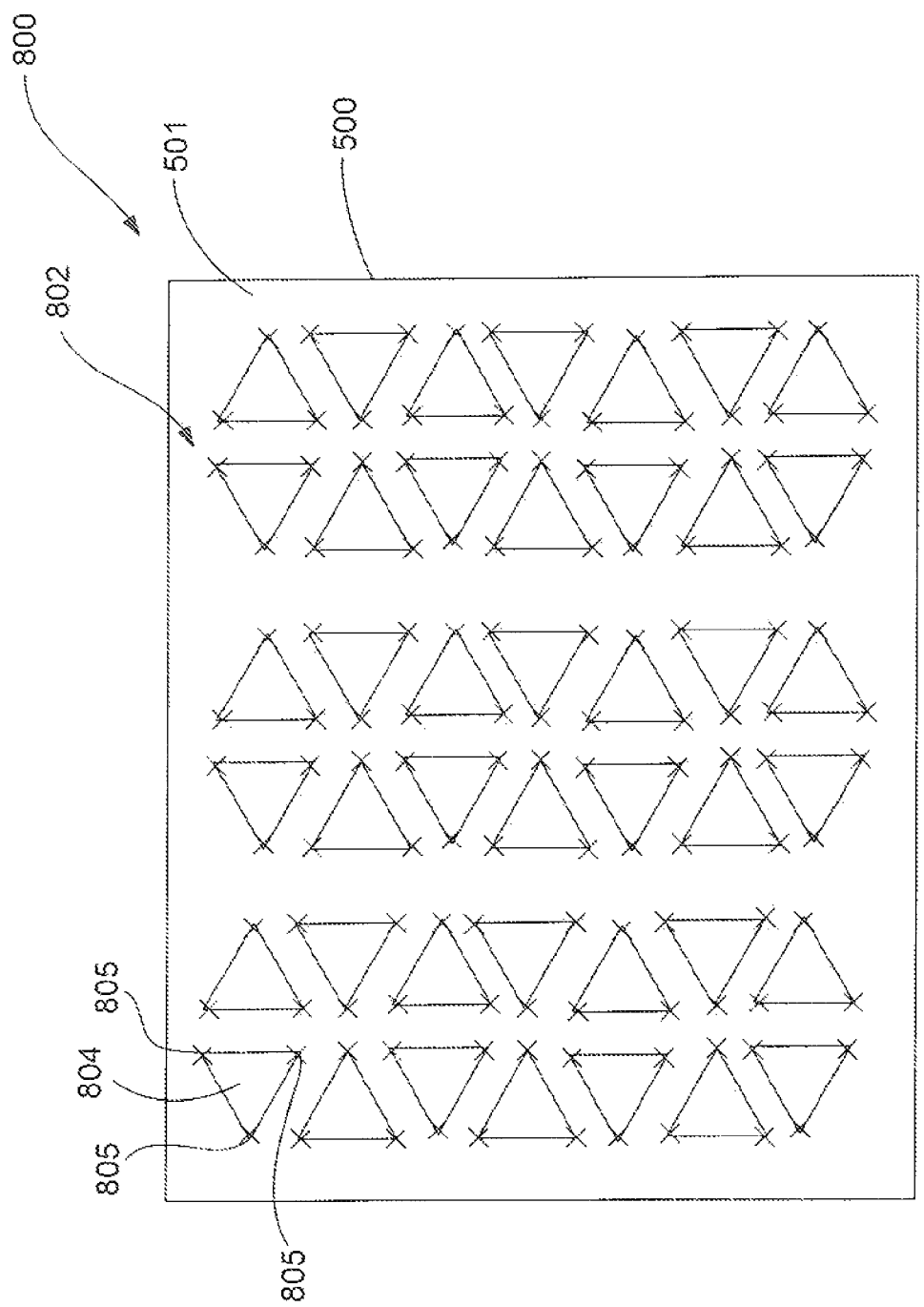
FIG. 8 is a schematic plan view of an optical structure including strained structures having a pattern that is combination of the strained-structure configurations shown in FIGS. 6 and 7 according to one embodiment of the present invention.

FIG. 8 shows an optical structure 800, according to yet another embodiment of the present invention, in which the color centers 406 are selectively positioned within the optical medium 500. As with the optical structure 600, an array 802 of triangular-shaped strained structures 804 is formed on the interfacial surface 501 of the optical medium 500 in the same or similar manner as the strained structures 506 shown in FIGS. 5A-5D. However, unlike the optical structure 700, the strained structures 804 are spaced from each other sufficient distances so that strain fields between adjacent vertices do not generally interact. Accordingly, after annealing, the color centers 406 (represented as an X) diffuse into strain-localization regions within the optical medium 500 located at or proximate the interfacial surface 501 and adjacent to lower vertices 805 of each of the strained structures 804.

Figure 9:
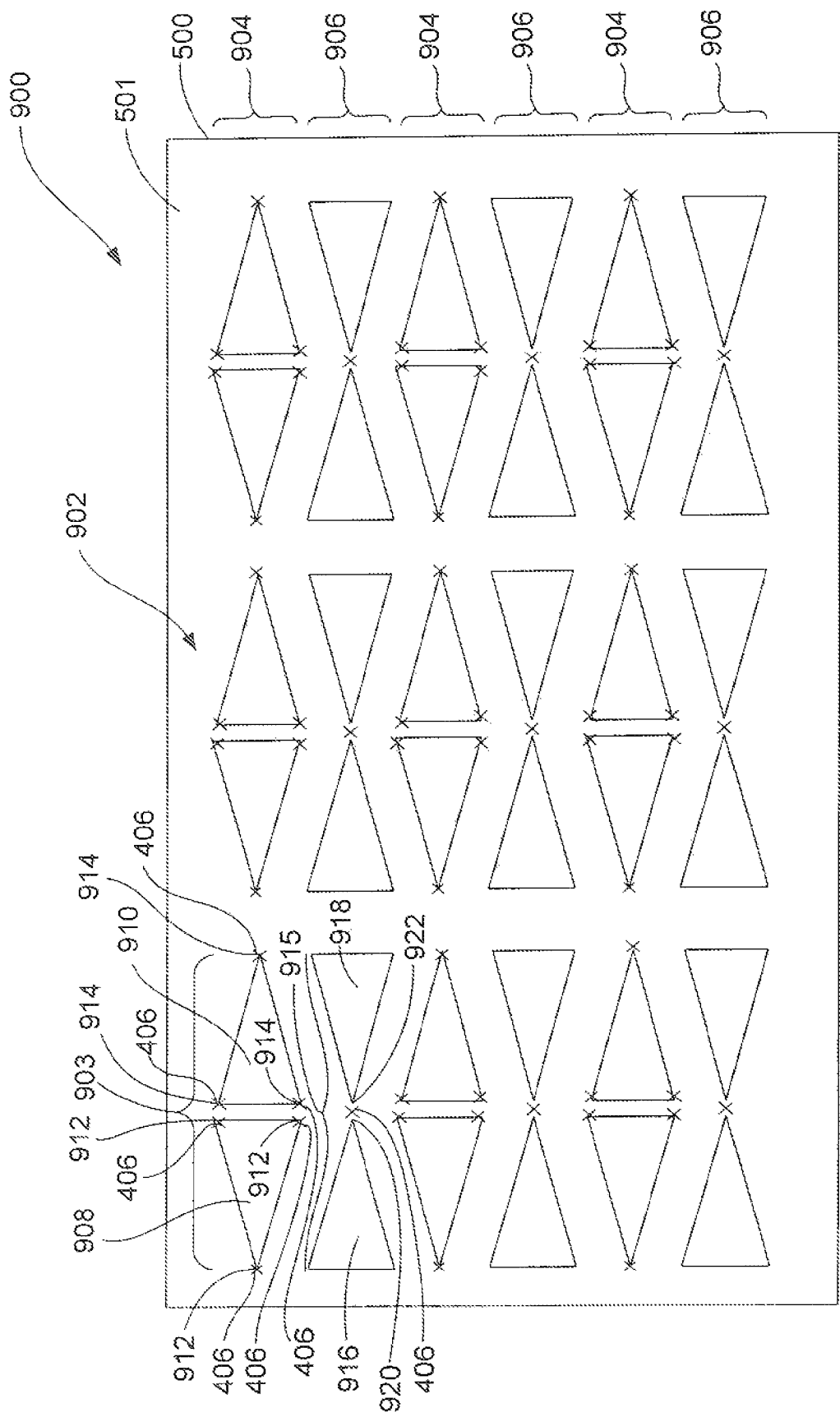
FIG. 9 is a schematic plan view of an optical structure including arrangement of strained structures for selectively positioning color centers in an optical medium according to yet another embodiment of the present invention.

FIG. 9 shows an optical structure 900, according to another embodiment of the present invention, in which the color centers 406 are selectively positioned within the optical medium 500. An array 902 of triangular-shaped strained structures is formed on the interfacial surface 501 of the optical medium 500 in the same or similar manner as the strained structures 506 shown in FIGS. 5A-5D. As shown in FIG. 9, the array 902 includes alternating rows 904 and 906 of strained structures. The rows 902 include pairs 903 of strained structures 908 and 910. The strained structure 908 includes lower vertices 912, with one of the color centers 406 (represented with an X) positioned within the optical medium 500 at or proximate the interfacial surface 501 adjacent to each of the lower vertices 912. The strained structure 910 includes lower vertices 914, with one of the color centers 406 positioned within the optical medium 500 at or proximate the interfacial surface 501 adjacent to each of the lower vertices 914. As previously discussed, annealing promotes diffusion of the color centers 406 to a position at or proximate a location of maximum strain within the optical medium 500 adjacent to the lower vertices 912 and 914. The rows 906 include pairs 915 of strained structures 916 and 918. The strained structure 916 includes a lower vertex 920 and the strained structure 918 includes an opposing lower vertex 922. As within the optical structure 700 shown in FIG. 7, by positioning the strained structures 916 and 918 sufficiently close to each other, the strain fields in the optical medium 500 associated with the vertices 920 and 922 interact so that a maximum strain is located within the optical medium 500 at or proximate the interfacial surface 501 and between the vertices 920 and 922. Accordingly, upon annealing, a portion of the color centers 406 also diffuse to a location within the optical medium 500 between the vertices 920 and 922.

It should be understood that a number of different configurations for strained structures formed on the optical medium 500 may be created. The configurations for the strained structures of the optical structures 500, 600, 700, 800, and 900 merely illustrate different structures that enable selectively positioning the color centers 406 within the optical medium. Other geometries, materials, and processes for the strained structures may be used in order to selectively position color centers within an optical medium.

Figure 10A:
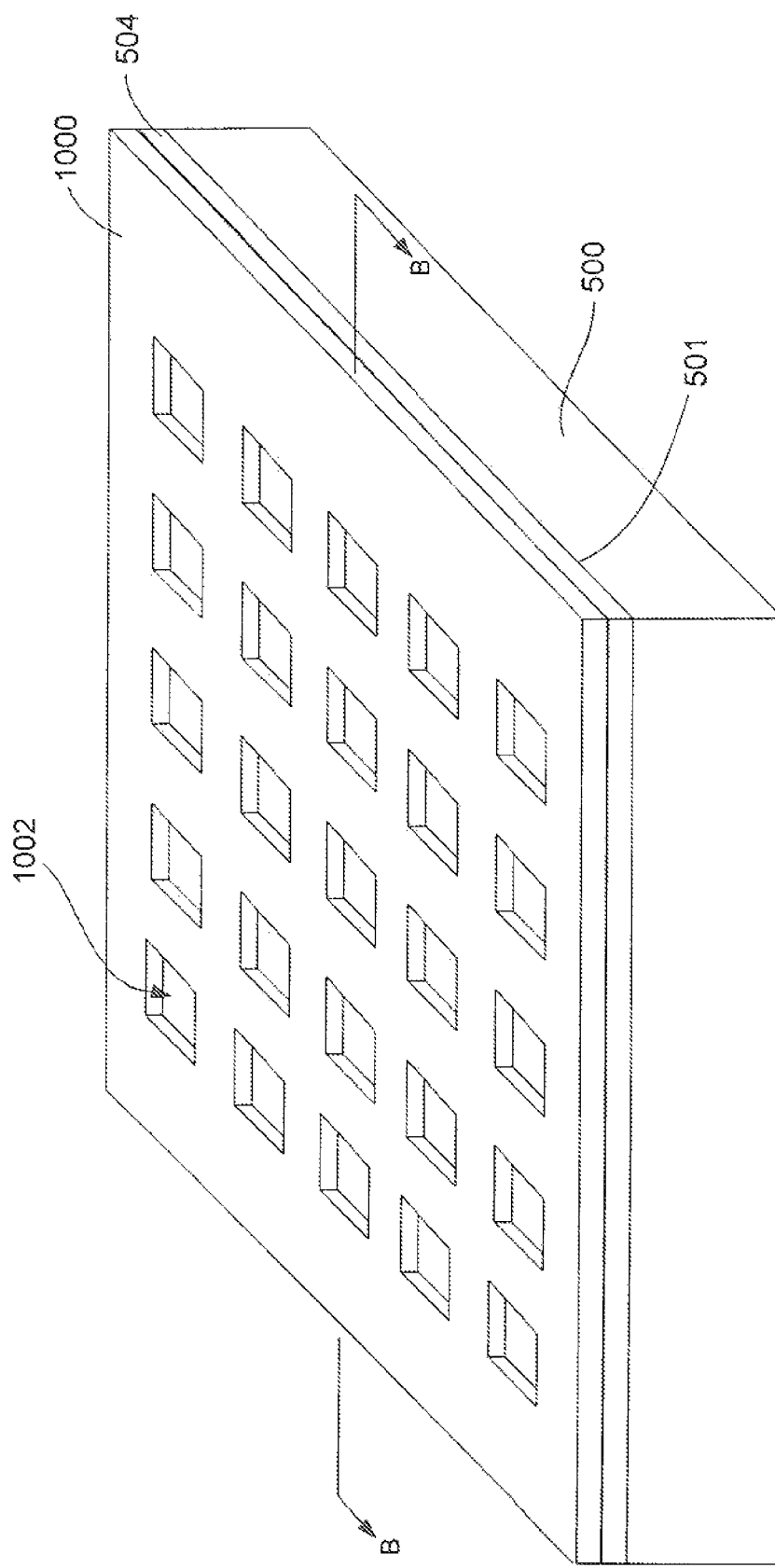
FIG. 10A is a schematic isometric view.

FIGS. 10A-10C illustrate various stages in a method of forming an optical structure in which ion implantation is used to alter the strain distribution in a strained layer formed on an optical medium according to one embodiment of the present invention. As shown in FIG. 10A, a mask 1000 having openings 1002 is formed on the strained layer 504. For example, the mask 1000 may be a hard mask, a patterned resist layer, or another suitable type of mask. As shown in the schematic cross-sectional view of FIG. 10B that is taken along line B-B of FIG. 10A after removing the mask 1000, ions are implanted into selected regions of the strained layer 504 through the openings 1002 in the mask 1000 to form strained-relieved portions 1004 and strained portions 1006, with a boundary 1005 formed between adjacent strained-relieved portions 1004 and strained portions 1006. Strain-localization regions 1007 are generated within the optical medium 500 adjacent to the boundaries 1005. As previously discussed, the strain-localization regions 1007 are regions within the optical medium 500 in which strain is localized and a distribution of strains and stresses are present within each of the strain-localization regions 1007.

As shown in FIG. 10C, after ion implantation, the in-process structure shown in FIG. 10B is subjected to an annealing process so that at least a portion of the color centers 406 diffuse to locations at or proximate the interfacial surface 501 adjacent to the boundaries 1005 within the strain-localization regions 1007. As previously described, the color centers 406 may be located at or proximate a maximum strain within each of the strain-localization regions 1007. Accordingly, the color centers 406 may be selectively positioned in a number of different arrangements within the optical medium 500 by relieving strain in selected portions of the strained layer 504.

In another embodiment of the present invention that is a variation on the method shown in FIGS. 10A-10C, instead of using the strained layer 504, a generally strain-free layer may be formed over the interfacial surface 501 of the optical medium 500. In such an embodiment, portions of the strain-free layer that are implanted with ions through the openings 1002 of the mask 1000 are strained due to incorporation of ions within the exposed portions. Upon annealing, the color centers 406 diffuse to locations at or proximate the interfacial surface 501 adjacent to boundaries between the ion-implanted portions of the layer and the unexposed regions of the layer.

Figure 11A:
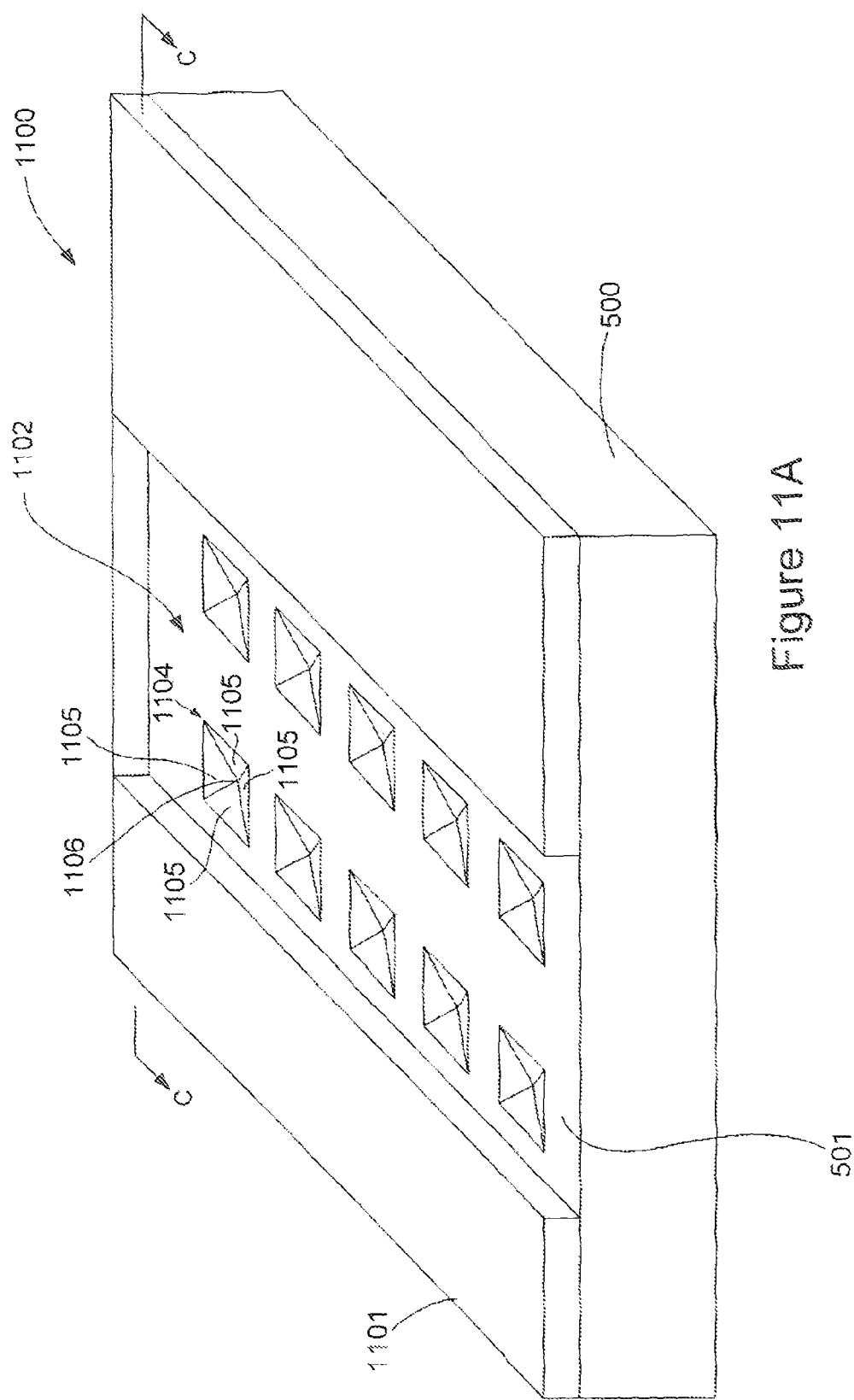
FIG. 11A is a schematic isometric cut-away view of an optical structure including an optical medium having a selected pattern of surface relief with a conformal strained layer formed over the selected pattern of surface relief according to one embodiment of the present invention.
Figure 11B:
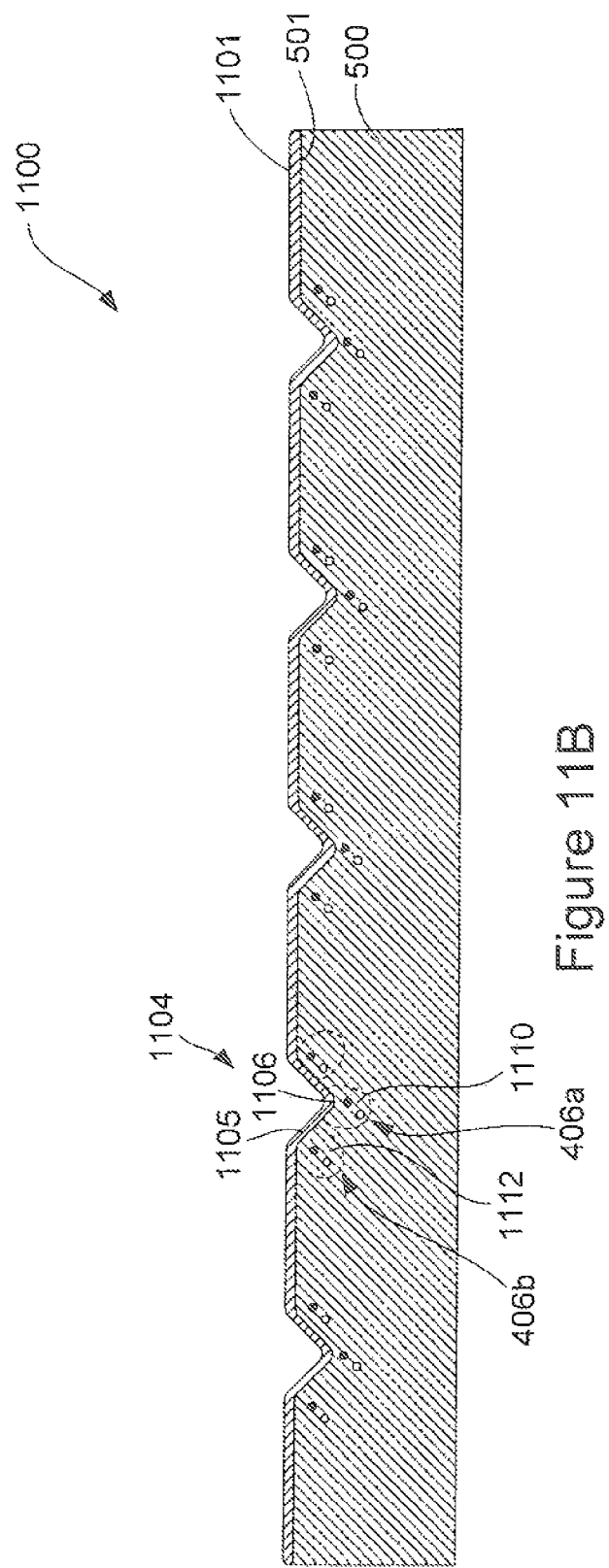
FIG. 11B is a schematic cross-sectional view of the optical medium taken along line C-C shown in FIG. 11A.

FIGS. 11A and 11B show an optical structure 1100 in which strain-localization regions are generated in the optical medium 500 by forming a selected pattern of surface relief in the optical medium 500 in conjunction with a strained layer formed on the optical medium 500 according to one embodiment of the present invention. As shown in FIGS. 11A and 11B, an array 1102 of recesses 1104 may be formed in the optical medium 500 using a selective material removal process, such as masked or focused ion beam milling, RIE, or another suitable material removal process. Each of the recesses 1104 may be defined by surfaces 1105 that intersect with each other to form a vertex 1106. However, in other embodiments of the present invention, the recesses 1104 may have less well-defined surfaces. A conformal strained layer 1101, which may be formed from the same materials and using the same methods as the strained layer 504 shown in FIG. 5A, is deposited on the surface 501. The combination of the strained layer 1101 and the configuration of the recesses 1104 induce strain-localization regions 1110 and 1112 (See FIG. 11B) adjacent to the recesses 1104. Thus, the strained layer 1101 generates strain in the underlying optical medium 500 and the combination of strained layer 1101 and the recesses 1104 function as stress-concentration features that locally intensify the strain within the optical medium 500 to form the strain-localization regions 1110 and 1112.

As best shown in FIG. 11B, after forming the strained layer 1101 and the recesses 1104, annealing promotes diffusion of the color centers 406 to the strain-localization regions 1110 and 1112. For example, a color center 406a may diffuse to one of the strain-localization regions 1110 and reside at or proximate to the vertex 1106 of one of the recesses 1104 and a color center 406b may diffuse to one of the strain-localization regions 1112 and reside at or proximate to one of the surfaces 1105 of the recess 1104. For example, as shown in FIG. 11B, the color center 406b may reside at or proximate to the intersection of one of the surfaces 1105 and the surface 501 of the optical medium 500.

Figure 12:
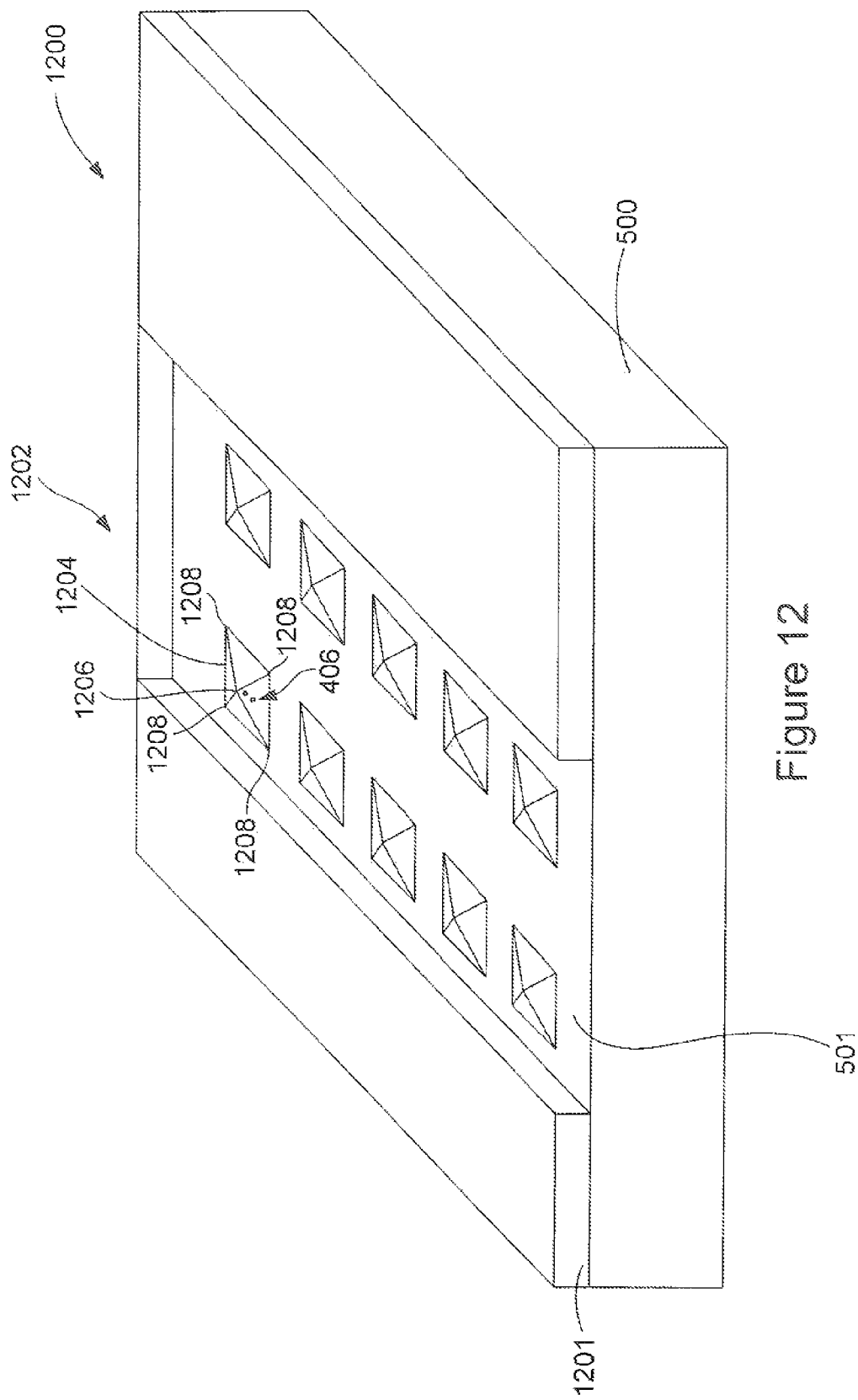
FIG. 12 is a schematic isometric cut-away view of an optical medium including a selected pattern of surface relief with a conformal strained layer formed over the selected pattern of surface relief according to yet another embodiment of the present invention.

FIG. 12 shows another embodiment of the present invention of an optical structure 1200 in which surface relief in conjunction with a conformal strained layer are employed for generating strain-localization regions within an optical medium. The optical structure 1200 includes an array 1202 of projections 1204 formed in the optical medium 500. The projections 1204 may be defined in the optical medium 500 using a selective material removal process, such as anisotropic wet etching or focused ion beam milling. The projections 1204 serve the same or similar function as the recesses 1104 shown in FIGS. 11A and 11B. A conformal strained layer 1201, which may be formed from the same materials and using the same methods as the strained layer 504 shown in FIG. 5A, is deposited on the surface 501. The combination of the strained layer 1201 and the configuration of the projections 1204 induce strain-localization regions (not shown) at and proximate to a tip 1206 and vertices 1208 of each of the projections 1204. As with the previously described embodiments of the present invention, annealing the optical medium 500 with the projections 1204 promotes diffusion of color centers embedded within the optical medium 500 to the strain-localization regions. For example, the color centers 406 are shown located at or proximate to the tip 1206 of each of the projections 1204.

In another embodiment of the present invention, each of the projections 1204 may be a self-assembled heterostructure formed on the surface 501 of the optical medium 500. For example, when the optical medium 500 is formed of diamond, each of the self-assembled heterostructures may be an island of silicon, germanium, or gallium arsenide formed by stresses induced by the different lattice parameter of the deposited material and the diamond.

Figure 13:
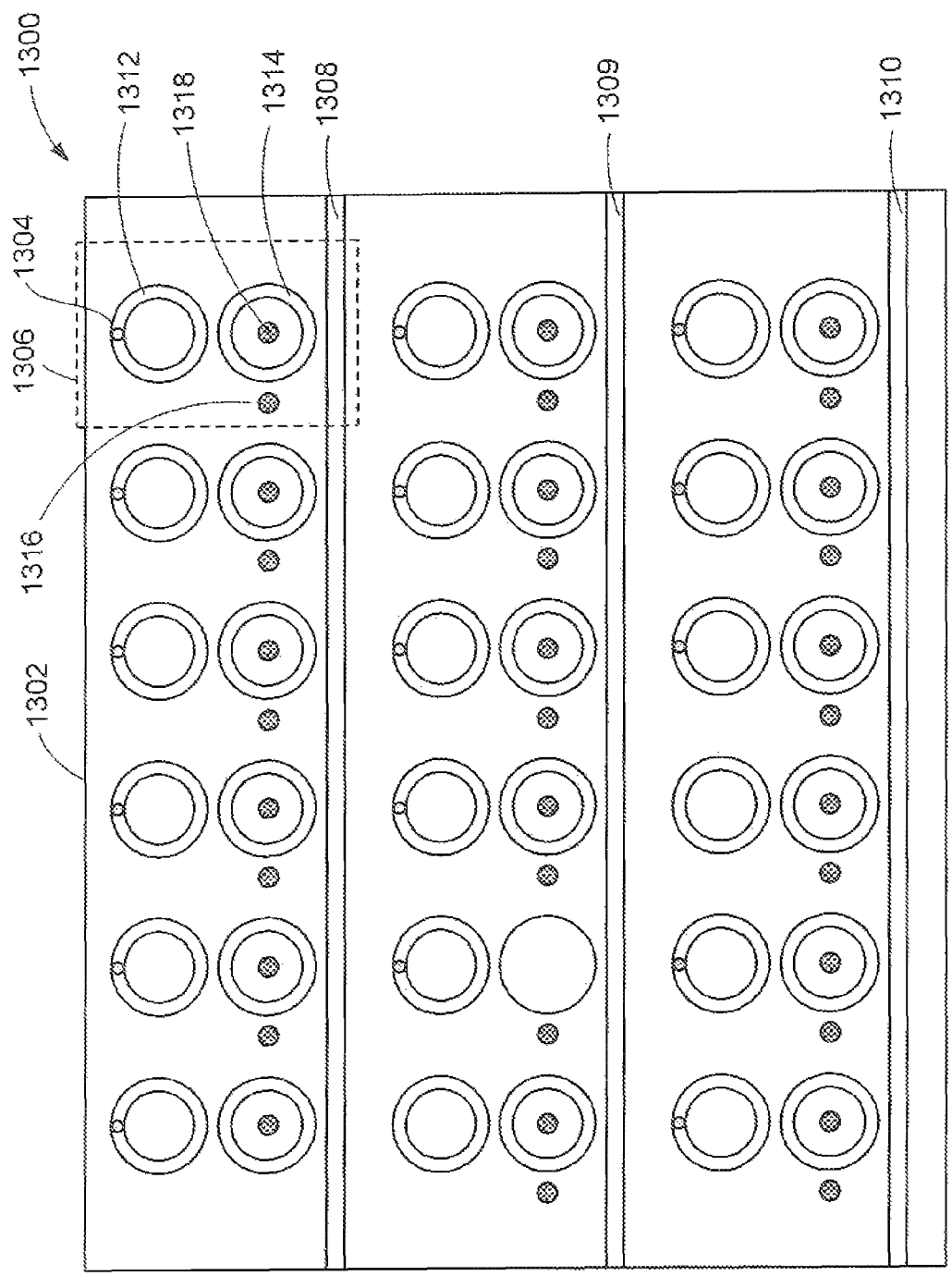
FIG. 13 is a schematic plan view of a photonic chip, according to one embodiment of the present invention, which may use any of the previously described embodiments of optical structures.

The above-described optical structures, with selectively positioned color centers, may be utilized in a number of different diamond-color-center based photonic/quantum electronics devices. FIG. 13 shows a color-center based photonic chip 1300 according to one embodiment of the present invention. The photonic chip 1300 is an example of a quantum computing architecture that may be operated as a processor, memory array, or any other device in applications, such as quantum computing, quantum information processing, storing quantum information, and metrology. The photonic chip 1300 includes an optical structure 1302, such as any of the previously described optical structures, with a generally regularly positioned array of color centers 1304. The photonic chip 1300 may include a photonic network of, for example, 18 identically configured nodes, such as node 1306, and 3 bus ridge waveguides 1308-1310 that are formed in semiconductor material or a high refractive index dielectric. The node 1306 includes a first microring 1312 positioned over and optically coupled to one of the color centers 1304 of the optical structure 1302, and a second microring 1314 that is coupled to a first electrode 1316 and a second electrode 1318. The first microring 1312 transmits electromagnetic waves to and from the color center 1304. Various types of color centers may be used, such as NV centers and any of the previously described color centers. Each of the color centers may be used to store a quantum bit of information. The bus waveguides 1308-1310 transmit information encoded in photons to, and from, the nodes and may be separately coupled to optical fiber input/output couplers (not shown). Electrical signal lines (not shown) that extend perpendicular to the chip 1300 surface may transmit current to operate each of the electrodes.

Figure 1:
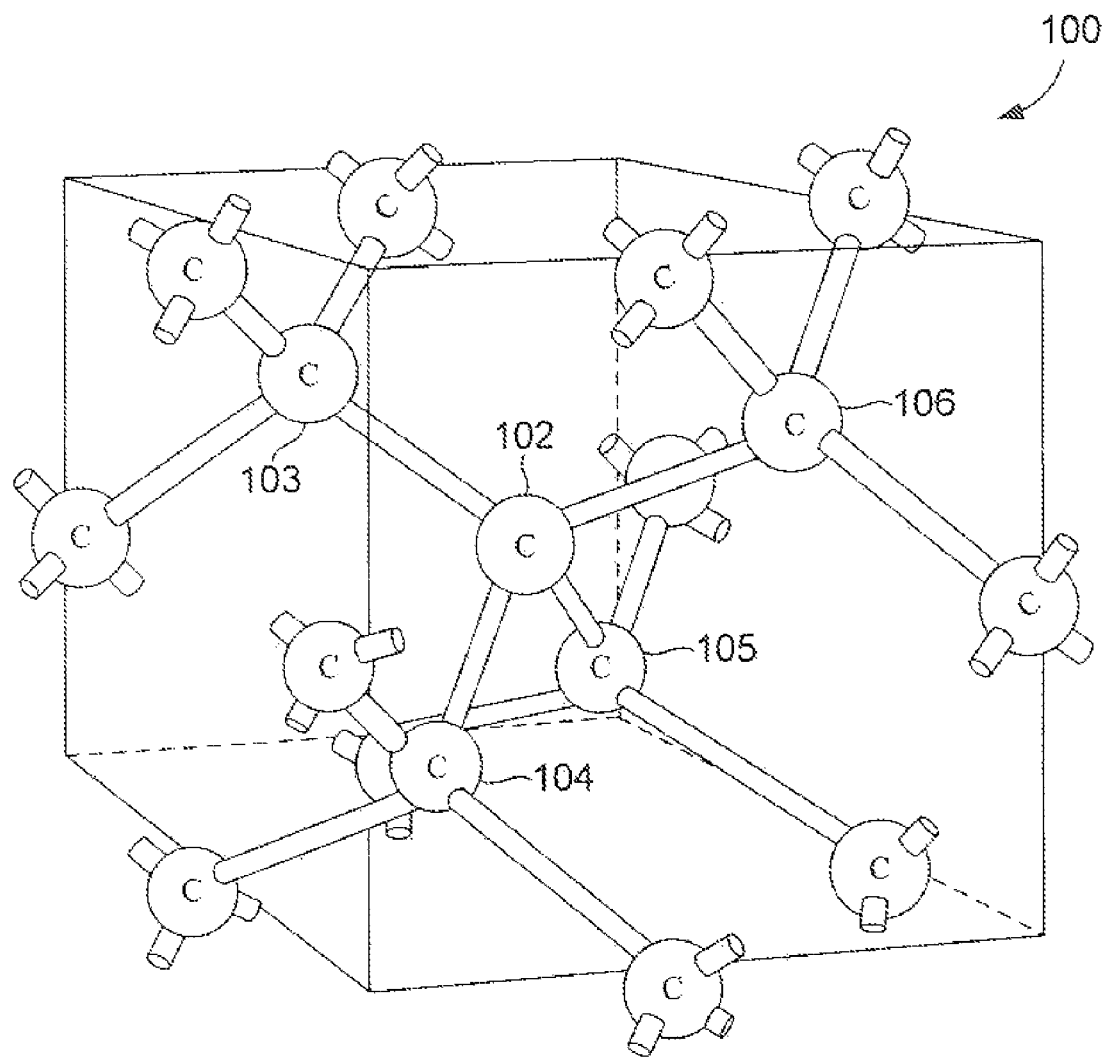
FIG. 1 is a unit cell of a diamond-crystal lattice.
Figure 2:
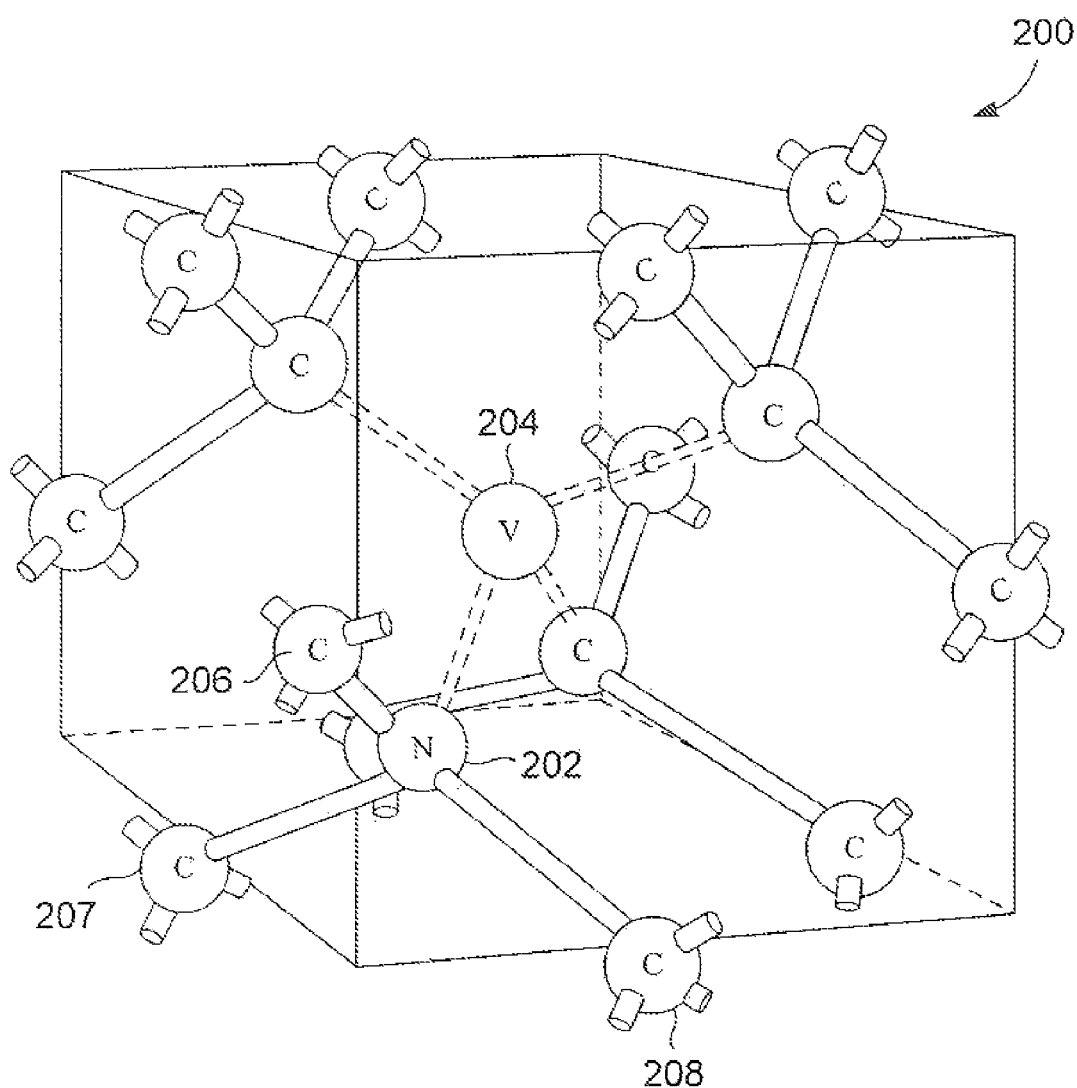
FIG. 2 is a diamond-crystal lattice including a nitrogen-vacancy center.
Figure 3:
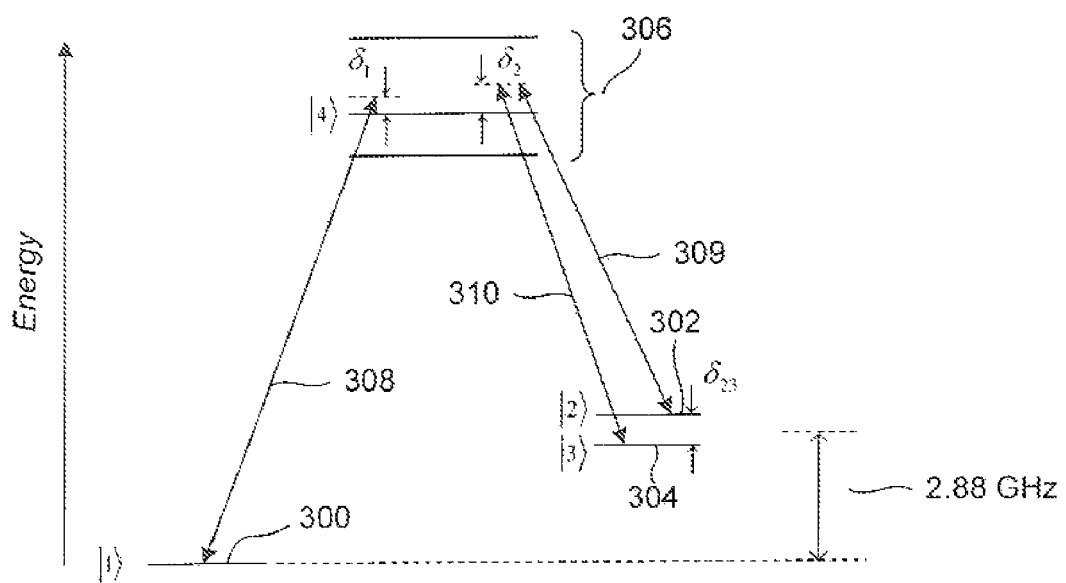
FIG. 3 is an energy-level diagram of a negatively charged nitrogen-vacancy center.

During operation, at each of the nodes, an electromagnetic wave is transmitted between a bus waveguide and a node color center via evanescent coupling. For example, an electromagnetic wave transmitted along the bus waveguide 1308 may be transmitted by evanescent coupling to the microring 1314. The electromagnetic wave resonates in the microring 1314 and may again be transmitted by evanescent coupling to the microring 1312. When the energy of the electromagnetic wave is large enough, the color center 1304 may absorb the energy by undergoing an electronic state change, as described above, for example, with reference to FIG. 3. Also, when the color center 1304 undergoes an electronic state transition, an electromagnetic wave emitted from the color center may be transmitted from the first microring 1312 to the second microring 1314, and from the second microring 1314 to the bus waveguide 1308 via evanescent coupling.

The dimensions of each of the microrings may be different and/or each of the microrings may be patterned with holes of different arrangements and sizes so that each microring may maintain resonance of an electromagnetic wave of a particular wavelength. As a result, the microring of each of the nodes may serve as a drop/add filter by extracting an electromagnetic wave of a particular wavelength out of numerous electromagnetic waves transmitted in an adjacent bus waveguide and by placing an electromagnetic wave of a particular wavelength into the adjacent bus waveguide.

The second microring and the first and second electrodes of each of the nodes form a switch that may be used to selectively turn each of the nodes "on" or "off." For example, each of the switches may be used to turn "off" a node by changing the second microring resonance frequency. As shown in FIG. 13, a switch includes the second microring 1314, first electrode 1316, and second electrode 1318. An appropriate positive or negative voltage applied between the first electrode 1316 and the second electrode 1318 changes the refractive index of the second microring 1314. By changing the refractive index of the second microring 1314, the resonance frequency of the second microring 1314 may be shifted away from the absorption and/or emission frequency of the color center 1304. As a result, the color center 1304 and the bus waveguide 1308 are no longer coupled. In another embodiment of the present invention, thermal refractive index tuning may be used to supply heat via the electrodes that changes the refractive index of the coupled microring. In yet another embodiment of the present invention, the photonic chip 1300 may exclude the electrodes coupled to the microrings. Individual nodes may be turned "on" or "off" by changing the refractive index of a switch microring using an incident electromagnetic wave of a particular wavelength.

Although the present invention has been described in terms of particular embodiments, it is not intended that the invention be limited to these embodiments. Modifications within the spirit of the invention will be apparent to those skilled in the art. In another embodiment of the present invention, all or some of the microrings shown in FIG. 13 may be replaced with a two-dimensional photonic crystal that includes resonant cavities coupled to the color centers of the optical structures, a one-dimensional photonic crystal that includes a Fabry-Perot cavity coupled to the color centers of the optical structures, or a microdisk. In yet another embodiment of the present invention, strain-localization regions may be formed in an optical medium by plunging a tip from, for example, an atomic force microscope ("AFM") or a scanning tunneling microscope ("STM") into selected locations of a surface of the optical medium.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. An optical structure, comprising:
   an optical medium including a number of strain-localization regions; and
   a number of color centers distributed within the optical medium in a generally selected pattern, at least a portion of the strain-localization regions including one or more of the color centers.

2. The optical structure of claim 1, further comprising:
   a number of strained structures formed on a surface of the optical medium, each of the strained structures including at least one stress-concentration feature that induces a corresponding one of the strain-localization regions in the optical medium.

3. The optical structure of claim 2 wherein the strained structures are spaced apart so that the strain-localization regions do not substantially interact with each other.

4. The optical structure of claim 1, further comprising:
   a number of strained structures formed on a surface of the optical medium, the strained structures arranged in a selected pattern so that a maximum strain within each of the strain-localization regions is positioned between adjacent strained structures of the number of strained structures.

5. The optical structure of claim 1, further comprising a number of surface-relief features formed on the optical medium.

6. The optical structure of claim 5, further comprising a strained layer formed over a surface of the optical medium including the surface-relief features, each of the strain-localization regions located at least proximate one of the surface-relief features.

7. The optical structure of claim 1, further comprising:
   a layer formed on the optical medium, the layer including first portions implanted with ions and second portions not implanted with ions, each of the strain-localization regions located adjacent to a boundary between adjacent first and second portions.

8. The optical structure of claim 1 wherein the optical medium comprises one of:
   diamond;
   aluminum oxide; and
   a refractory metal oxide.

9. The optical structure of claim 1 wherein each of the color centers comprises one of:
   a nitrogen-vacancy center;
   a nickel center;
   a nickel-nitrogen complex center; and
   a silicon-vacancy center.

10. A photonic chip, comprising:
    an optical structure comprising:
      an optical medium including a number of strain-localization regions; and
      a number of color centers distributed within the optical medium in a generally selected pattern, at least a portion of the strain-localization regions including at least one of the color centers;
    a bus waveguide;

a number of nodes, each of the nodes configured to be selectively coupled to the bus wave guide, wherein each of the nodes comprises:
- a photonic device configured to transmit one or more electromagnetic waves;
- at least one color center of the number of color centers, the at least one color center coupled to the photonic device; and
- a switch operable to selectively control transmission of electromagnetic waves between the between the bus waveguide and the at least one color center.

11. A method of positioning color centers in an optical medium, comprising:
- generating a number of strain-localization regions in the optical medium; and
- annealing the optical medium to promote diffusion of at least a portion of the color centers to the strain-localization regions.

12. The method of claim 11 wherein generating a number of strain-localization regions in the optical medium comprises:
- depositing a strained layer on a surface of the optical medium;
- patterning the strained layer to form a number of strained structures, each of the strained structures including at least one stress-concentration feature located on the surface of the optical medium; and
- wherein each of the at least one stress-concentration feature induces a corresponding one of the strain-localizations regions in the optical medium.

13. The method of claim 11 wherein generating a number of strain-localization regions in the optical medium comprises:
- forming a selected pattern of surface-relief features on the optical medium; and
- forming a strained layer over the surface-relief features.

14. The method of claim 13 wherein forming a selected pattern of surface-relief features on the optical medium comprises:
- forming each of the surface-relief features as a recess or a projection.

15. The method of claim 13 wherein forming a selected pattern of surface relief features on the optical medium comprises:
- self-assembling the surface-relief features on a surface of the optical medium.

16. The method of claim 11 wherein generating a number of strain-localization regions in the optical medium comprises:
- depositing a strained layer on a surface of the optical medium; and
- implanting ions in selected portions of the strained layer to relieve strain in the selected portions.

17. The method of claim 11 wherein generating a number of strain-localization regions in the optical medium comprises:
- depositing a layer on a surface of the optical medium; and
- implanting ions in selected portions of the layer to generate strain in the selected portions.

18. The method of claim 11 wherein generating a number of strain-localization regions in the optical medium comprises:
- depositing a strained layer on a surface of the optical medium;
- patterning the strained layer to form a number of strained structures, each of the strained structures including at least one stress-concentration feature located on the surface of the optical medium; and
- arranging the strained structures so that a maximum strain within each of the strain-localization regions is located between adjacent strained structures of the number of strained structures.

19. The method of claim 11 wherein the optical medium comprises one of:
- diamond;
- aluminum oxide; and
- a refractory metal oxide.

20. The method of claim 11 wherein each of the color centers comprises one of:
- a nitrogen-vacancy center;
- a nickel center;
- a nickel-nitrogen complex center; and
- a silicon-vacancy center.

* * * * *

UNITED STATES PATENT AND TRADEMARK OFFICE
CERTIFICATE OF CORRECTION

PATENT NO.        : 7,805,030 B2                              Page 1 of 1
APPLICATION NO.   : 11/716174
DATED             : September 28, 2010
INVENTOR(S)       : Alexandre M. Bratkovski et al.

It is certified that error appears in the above-identified patent and that said Letters Patent is hereby corrected as shown below:

In column 12, line 39, in Claim 6, after "proximate" insert -- to --.

In column 13, line 10, in Claim 10, before "bus" delete "between the".

In column 13, lines 30-31, in Claim 12, delete "strain-localizations" and insert -- strain-localization --, therefor.

Signed and Sealed this
Twelfth Day of April, 2011

David J. Kappos
*Director of the United States Patent and Trademark Office*